United States Patent
Merelli et al.

(10) Patent No.: US 6,190,278 B1
(45) Date of Patent: Feb. 20, 2001

(54) DOUBLE STRAND ROLLER CHAIN WITH PHASED OR OFFSET PINS

(75) Inventors: Roberto Merelli, Monza Milan; Germinal Flavio Capucci, Carnate; Augusto Luigi Fanzani, Gessate, all of (IT)

(73) Assignee: MorseTEC Europe S.P.A. (IT)

( * ) Notice: Under 35 U.S.C. 154(b), the term of this patent shall be extended for 0 days.

(21) Appl. No.: 09/311,109

(22) Filed: May 13, 1999

(30) Foreign Application Priority Data

Jul. 21, 1998 (EP) .................................................. 98830439

(51) Int. Cl.[7] ............................ F16H 13/02; F16H 13/00; F16H 7/00
(52) U.S. Cl. .............................. 474/231; 474/209; 474/85
(58) Field of Search ............................ 474/85, 206, 207, 474/208, 209, 210, 231, 212–217, 228–250

(56) References Cited

U.S. PATENT DOCUMENTS

| | | | |
|---|---|---|---|
| 2,450,565 | 10/1948 | Saifyrd | .................................. 74/250 |
| 4,729,756 | * 3/1988 | Zimmer | ........................... 474/231 X |
| 5,192,252 | 3/1993 | Shurda et al. | ....................... 474/210 |
| 5,267,909 | * 12/1993 | Iacchetta | ............................... 474/206 |
| 5,395,291 | * 3/1995 | Fanning | ............................... 474/206 |
| 5,412,934 | * 5/1995 | Furuyama | ........................ 474/231 X |
| 5,507,697 | 4/1996 | Ledvina et al. | ......................... 474/85 |
| 5,683,319 | * 11/1997 | Mott et al. | ......................... 474/85 X |

FOREIGN PATENT DOCUMENTS 02076944   3/1990  (JP) ................................ F16G/13/02

OTHER PUBLICATIONS

European Search report, EP 98 83 0439, dated Dec. 4, 1998.

\* cited by examiner

Primary Examiner—David A. Bucci
Assistant Examiner—Marcus Charles
(74) Attorney, Agent, or Firm—Sidley & Austin; Greg Dziegielewski

(57) ABSTRACT

A power transmission roller chain includes pin links having pins spaced by one pitch and connected to each other by plates, and bushing links or "blocks" having bushings spaced apart from each other and rigidly connected to each other by plates. Two successive pin links are connected to each other by a bushing link having the bushings rotatably mounted on the pins. At least one pin link includes a central plate provided with pins alternately protruding from opposite faces of the plate offset from each other by a fraction of a pitch.

4 Claims, 3 Drawing Sheets

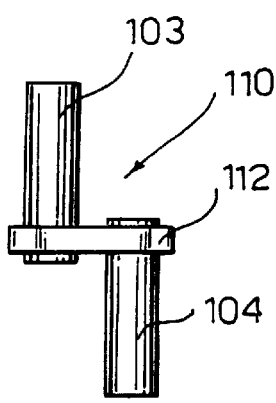
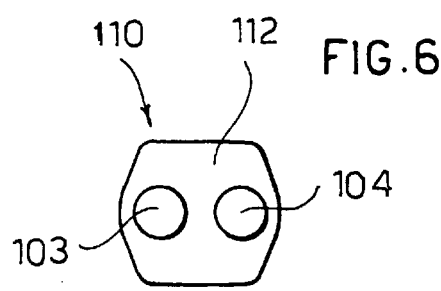
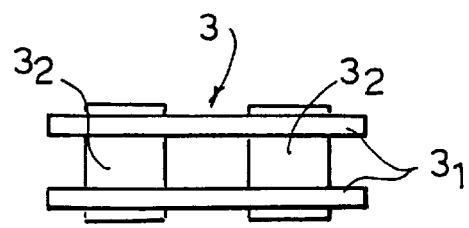
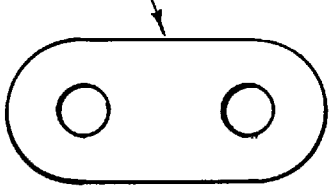
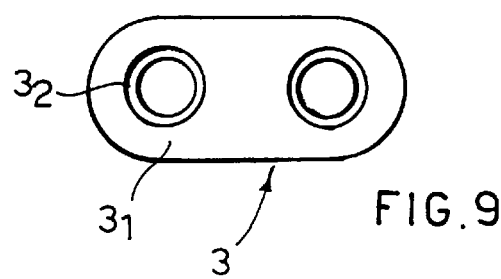
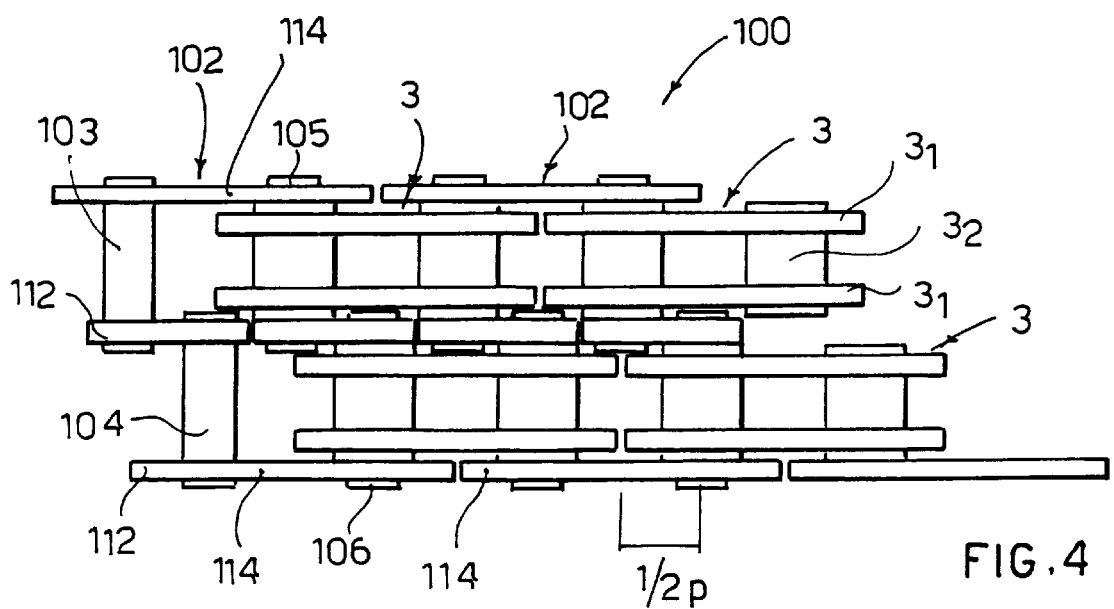

DOUBLE STRAND ROLLER CHAIN WITH PHASED OR OFFSET PINS

BACKGROUND OF THE INVENTION

The present invention relates generally to power transmission chains. The invention has particular application to power transmission chains of the roller chain variety, which are used primarily in automotive engine timing applications, but also can have automotive applications in the transfer of power from a torque converter to a transmission or in a transfer case of a four-wheel drive vehicle.

One type of chain is known as a "roller chain." A typical roller chain consists of alternate inner links and outer links. The inner links, which are also known as "bushing" links, consist of spaced inner plates with bushings tightly received in openings, or apertures, at each end of the inner plates. The outer links, which are also known as "pin" links or "guide" links, consist of spaced outer plates with pins tightly received in openings, or apertures, at each end of the outer plates. The bushings freely rotate about the pins to pivotally connect the outer links to the inner links in alternate arrangement. Rollers are provided on the bushings, and the roller chain is wrapped about a sprocket. The teeth of the sprocket are received between the laterally spaced plates and the longitudinally spaced rollers. Examples of roller chains are found in U.S. Pat. Nos. 4,196,617 and 5,226,856, which are both incorporated herein by reference.

Roller chain drives can include both "true roller" and rollerless design. The true roller design includes the described rollers mounted about the bushings. Rollerless chain or bushing chain contains bushings that directly contact the sprocket. Both types of roller chain are typically specified in industry as British Standard chain and American National Standards Institute (ANSI) chain.

A conventional roller chain drive includes an endless roller chain wrapped about at least two sprockets supported by shafts. Rotation of a driving sprocket causes power transmission through the chain and consequent movement of a driven sprocket. In an engine timing drive application, the driving sprocket is mounted on the engine crankshaft and the driven sprocket mounted on the camshaft. Various types of engine timing systems and configurations, which are suitable for roller chain assemblies, are shown in U.S. Pat. No. 5,427,580 which in incorporated herein by reference.

The present invention has particular application to chain assemblies in which the chains and sprockets are offset, or phased, to modify the impact noise spectrum and chordal action noise spectrum. In a typical phased chain system, a single strand chain assembly is divided into, or replaced by, two side-by-side chains that are phased or offset typically by one-half pitch.

Noise is generated with chain drives which can be caused, in part, by the impact sound generated by the collision of the chain and the sprocket at the onset of meshing. Many efforts have been made to decrease the overall noise level and pitch frequency noise distribution in automotive chain drives. Phasing the chain and sprocket relationship can reduce the number of chain rollers (or mass) impacting the sprocket during a given time increment. Similarly, phasing the chain and sprocket relationship can alter or phase the chordal action or articulation of the chain and sprocket. The present invention finds application in phased roller chain systems.

Phased chain systems as well as side-by-side non-phased systems are conventionally constructed with the two chains in a spaced-apart relationship. The spacing is provided between the two chains to assure that the chains do not contact one another during operation. In high speed automotive applications, significant movement occurs in the portions of each chain that span the longitudinal space between the driving and driven sprockets of each assembly. The separation between the two chains in the transverse direction is provided to prevent any contact between the two chain during such movement. Clearances between the chain and other structures are typically recommended in order to avoid contact from longitudinal or transverse movement of the chain during operation. The separation distance between the chains also contributes to the size or overall width of the chain package.

A portion of a roller chain having a single strand is illustrated in FIG. 1 and indicated generally by reference numeral 1 and each bushing link or "block" is indicated with reference numeral 3. A pin link 2 includes two plates $2_1$, $2_1$ integral and rigid connected by parallel pins $2_2$, $2_2$. A bushing link includes two plates $3_1$, $3_1$ respectively rigidly connected by parallel bushings $3_2$, $3_2$. Each bushing link 3 connects together two adjacent pin links and, conversely, each pin link connects together two adjacent bushing links.

In order to transmit heavy loads a double-strand chain as illustrated in FIG. 2 and indicated generally by reference numeral 10 has conventionally been used. This chain includes a series of pin links and bushing links or blocks connected one to the other. The pin links 12 have pins $12_2$ double the length of those of the chain in FIG. 1 and rigidly constrained to each other at their ends by means of outer plates $12_2$ double the length of those of the chain in FIG. 1 and rigidly connected to each other at their ends by means of outer plates $12_1$, $12_1$ and in an intermediate position by means of an intermediate plate 123. The bushing links 3 or "blocks" are conventional as in the example in FIG. 1; each includes two plates $3_1$, $3_1$ which rigidly constrain together two bushings $3_2$, $3_2$. Each pin link 12 is connected to the next one by means of two bushing links 3 located side by side on one side and the other of the intermediate plate $12_3$.

With the intention of reducing the noisiness of chains of the type illustrated in FIG. 2, though maintaining the strength thereof, use is also made of the system illustrated in FIG. 3 and indicated as a whole with reference numeral 20, which is composed of two roller chains 1, 1 like that shown in FIG. 1, arranged side by side and offset from each other by one-half pitch, i.e., with the axis of the pins and of the bushings of a chain offset by about ½ p with respect to those of the adjacent chain. Such a chain system is illustrated and described in U.S. Pat. No. 5,507,697 (1697). The '697 patent, though having given excellent results, nevertheless has the costly drawback that it is necessary to use two separate chains.

SUMMARY OF THE INVENTION

An object of the present invention is to facilitate assembly of a phased chain drive. A further object is to reduce the width of the chain drive. A further object is to reduce manufacturing costs.

The present invention includes a roller chain assembly with pin links having pins offset by a fraction of a pitch on opposite sides of a central plate. The pin links are connected to each other by bushing links or "blocks" of the conventional type.

According to one embodiment, the offset pin links include elements with two pins, comprising a central plate integral with two pins extending from opposite faces of the central plate and offset with respect to each other by one-half pitch or a fraction of a pitch.

According to another embodiment, the chain of the present invention includes pin link elements which include a central plate from which four pins extend projecting alternately from opposite faces of the central plate. The pins on opposite faces are offset with respect to each other by a half pitch or by a fraction of a pitch.

The chain of the present invention achieves the above mentioned objects. In particular, it facilitates production and assembly of the chain and allows the chain width to be reduced, width being defined as a direction transverse to the direction of chain travel.

For a better understanding of these and other aspects and objects of the invention, reference should be made to the following detailed description taken in conjunction with the accompanying drawings.

BRIEF DESCRIPTION OF THE DRAWINGS

In the drawings,

FIG. 4 is a side view of a portion of chain according to the present invention in one embodiment;

FIG. 5 illustrates a pin element of the chain in FIG. 4;

FIG. 6 is a plan view of the element in FIG. 5;

FIG. 7 is a plan view of an outer plate of the chain in FIG. 4;

FIG. 8 is an elevational view of a conventional block link used for the chain in FIG. 4;

FIG. 9 is a plan view of a conventional block link used for the chain in FIG. 4;

DETAILED DESCRIPTION OF THE PREFERRED EMBODIMENTS

Figure 1:
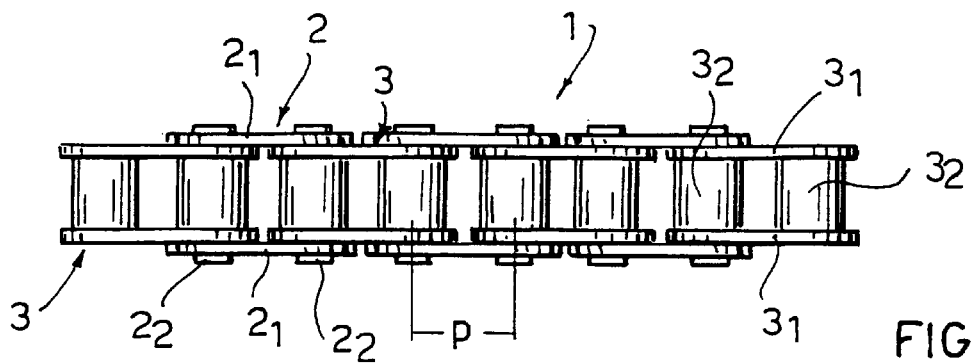
FIG. 1 illustrates a portion of a single strand roller chain of the prior art.
Figure 2:
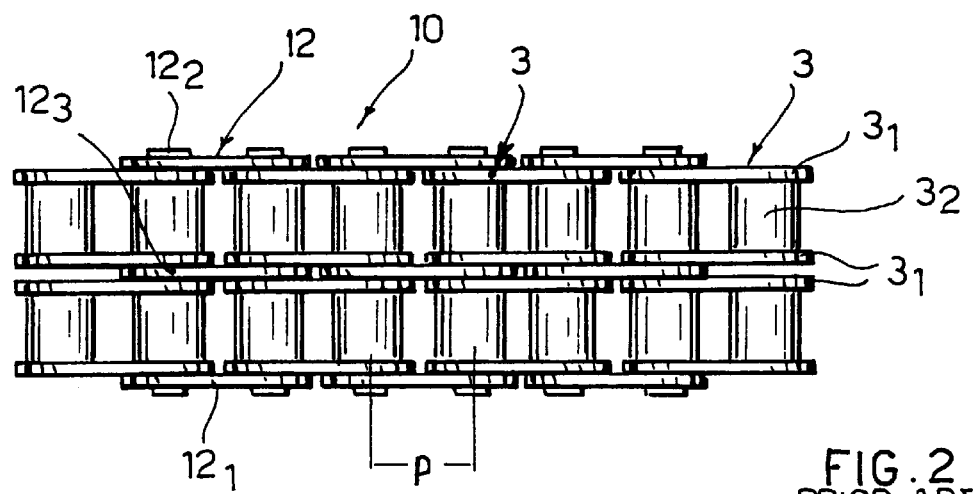
FIG. 2 illustrates a portion of double strand roller chain according of the prior art.
Figure 3:
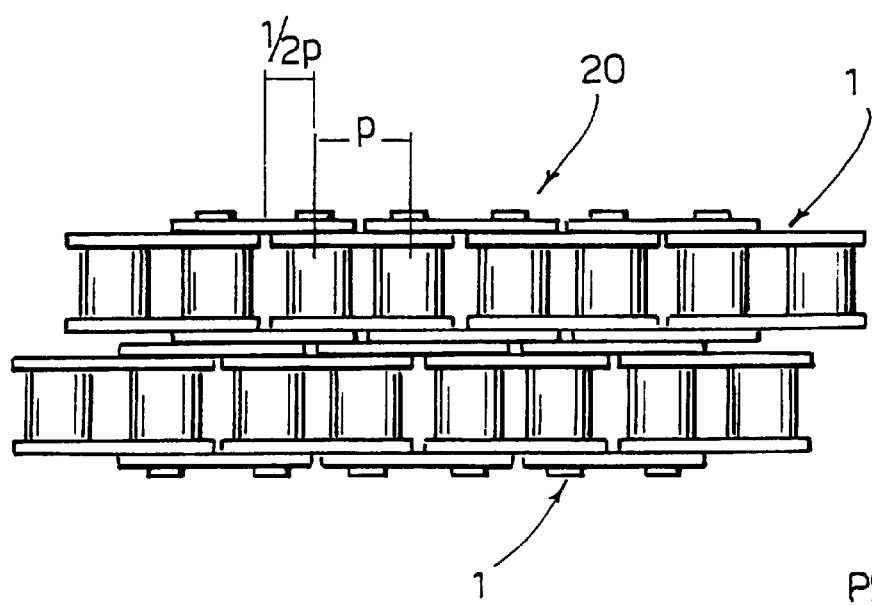
FIG. 3 illustrates two side by side chains offset or phased by one-half pitch of the prior art.

The chain of the present invention in FIG. 4 is indicated generally by reference numeral 100.

The chain 100 includes pin links 102 and bushing links consisting of traditional "blocks" as shown in FIG. 8, bearing reference numeral 3, similar to those described with reference to the prior art.

Each pin link 102 is composed of four pins indicated respectively with 103, 104, 105 and 106, with parallel axis, disposed with their axes offset from each other by one-half pitch. The offset pins are connected together in pairs to form elements like that indicated by 110 in FIG. 5, which provides pins 103 and 104 protruding in an alternate fashion from opposite faces of a central plate 112. The pins are closed at their ends by means of pin or outer link plates 114 like that illustrated in FIG. 7. When multiple pin links 102 are interleaved with multiple bushing links 3 the result is a single chain with two sides formed on opposite faces of the row of central plates 112, the two sides being phased with respect to each other.

In the embodiment illustrated in FIGS. 4 and 5, the central plate 112 is about half the length of one of the pin or bushing link plates.

Figure 10:
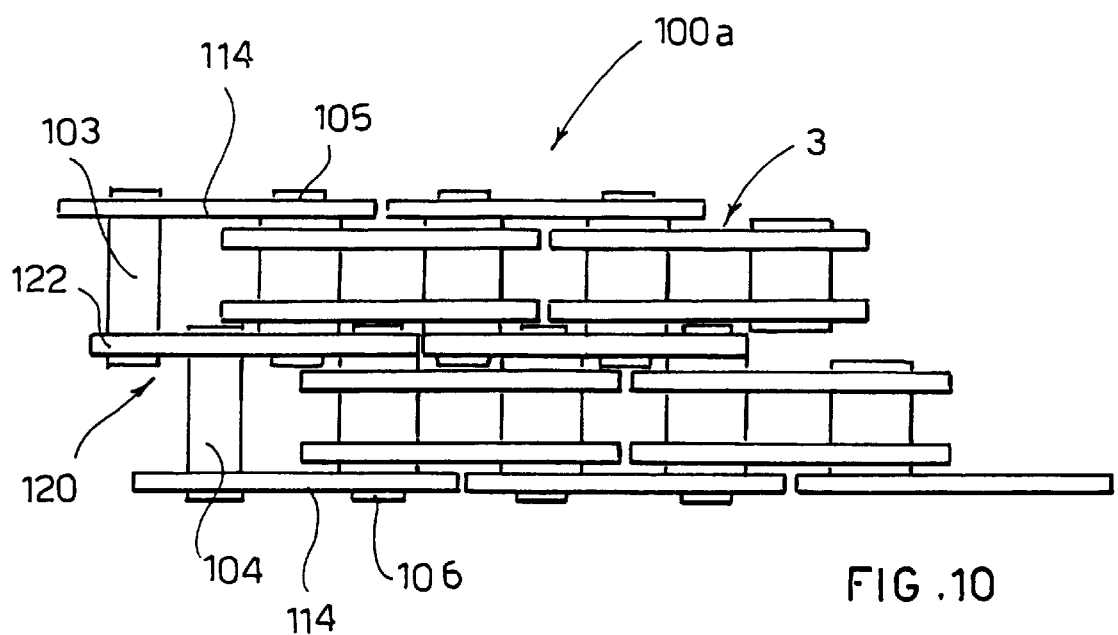
FIG. 10 illustrates a side view with parts removed of a portion of chain of the invention according to a variant; and, FIG. 11 illustrates the chain of FIG. 10 in an exploded side view.
Figure 11:
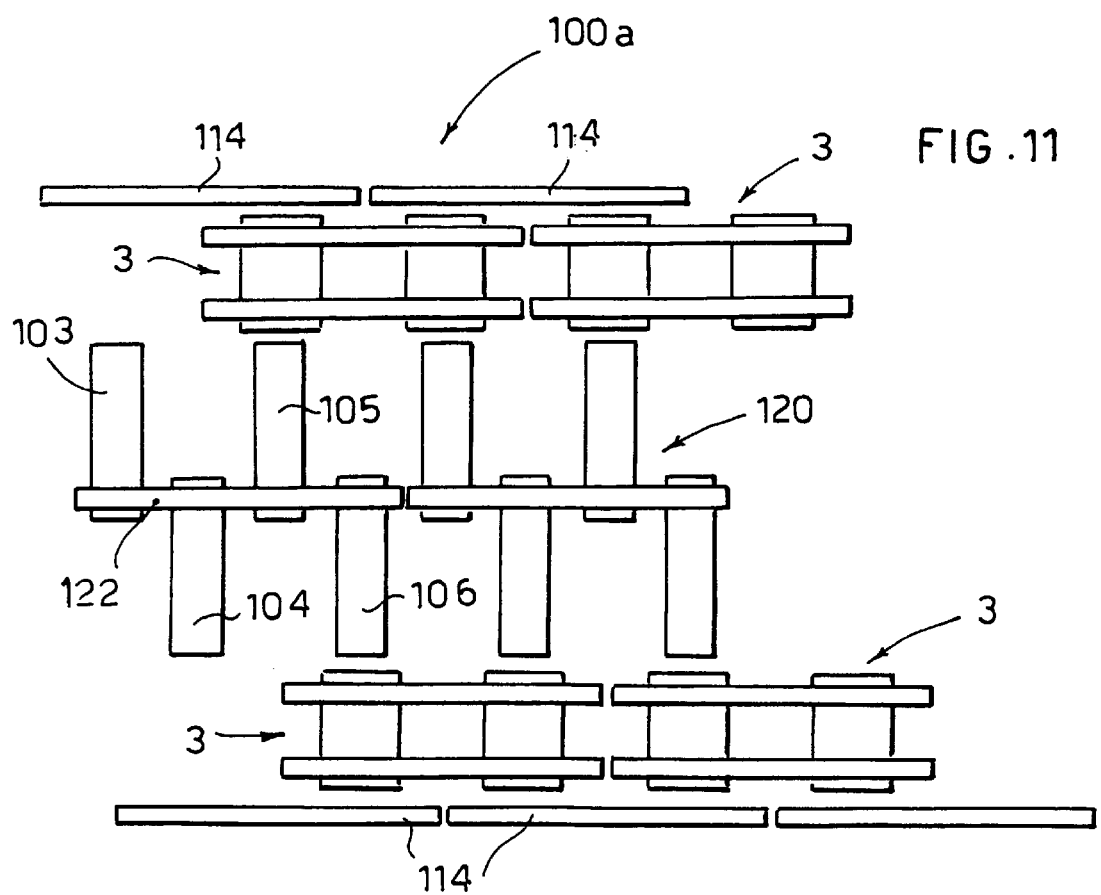

Alternatively, in the embodiment illustrated in FIGS. 10 and 11 a chain 100a of the invention is assembled from pin elements 120, each of which includes a central plate 122 from which four pins 103, 104, 105 and 106 extend. The pins are arranged to protrude alternately from the opposite faces of the central plate 122, each adjacent pin being offset by half a pitch with respect to the other and protruding in an alternate fashion from opposite faces of the plate. The two pins on a single face are offset by one pitch. The central plate 122 in the embodiment illustrated in FIGS. 10 and 11 is about the same length as that of a outer link plate or bushing link plate. Conventional bushing links or block links 3 are assembled on the central or pin elements 120 thus described, and arranged so as to join the pins of adjacent elements 120. For example, in FIG. 11, the pin 105 of an element 120 on the left with the pin 103 of element 120 on the right. The chain is then closed by application of outer link plates or pin link plates 114 that connect two pins of each pin element, for example, 104 and 106 or 103 and 105.

The chain of the present invention can be made up in two basic types: as a "bushing" chain with the block links composed solely of outer pin link plates and inner bushing plates or as a "roller" chain with the addition of an idle roller on each bushing.

Although only embodiments in which the pins of a pin element are offset or spaced from each other one-half pitch are described, chains comprising pin elements that have pins offset from each other by a different fraction of a pitch are understood as being included within the scope of the present invention.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A power transmission chain comprising:

a series of interleaved bushing links and pin links, each said pin link comprising a central plate having a plurality of apertures formed therein, said apertures being spaced apart from each other by a fraction of a pitch said central plate having opposite faces provided with a plurality of spaced pins, said plurality of spaced pins each being press fit in a corresponding one of said apertures, said spaced pins protruding from said central plate alternately from said opposite faces, said spaced pins being spaced apart from each other by a fraction of a pitch, each of said spaced pins having a fixed end fit in one of said apertures and a free end, each said pin link having a pair of outer link plates each of said outer link plates having a pair of apertures for fixedly receiving said free ends of said pins, each said bushing link having a pair of bushings mounted to turn on said pins of said interleaved pin links, said bushing links having bushing link plates fixedly mounted to said bushings, each bushing link plate having a pair of apertures for receiving said pair of bushings, said outer link plates maintaining said bushing links along said pins between said outer link plates and said central plate.

2. A chain according to claim 1, wherein each said central plate carries two pins offset from each other by one-half pitch, said pins protruding alternately from said opposite faces of each said central plate.

3. A chain according to claim 1, wherein each said central plate has four pins offset from each other by one-half pitch and protruding alternately from said opposite faces of said central plate.

4. A chain according to claim 1, in which said bushing links further comprise a pair of bushings, said bushings spaced from each other by one pitch, said bushings being rigidly constrained to a pair of bushing plates.

* * * * *